United States Patent Office 3,493,362
Patented Feb. 3, 1970

3,493,362
POLYBUTENES AS INHIBITORS OF PLANT GROWTH
Richard L. Ferm, El Cerrito, Calif., assignor to Chevron Research Company, San Francisco, a corporation of Delaware
No Drawing. Filed Jan. 23, 1967, Ser. No. 610,811
Int. Cl. A01n 5/00, 9/00
U.S. Cl. 71—127                                    6 Claims

ABSTRACT OF THE DISCLOSURE

Liquid polybutene, applied as such or as a solution in a compatible organic solvent or as an emulsion in water on the surface of plants, particularly on objectionable plant growth, such as mesquite, or on water-wasting vegetation, such as salt cedar, effectively inhibits such plant growth.

BACKGROUND OF THE INVENTION

Field of the invention

The present invention relates to a method of inhibiting growth of objectionable plants by intimately contacting the surface of these plants above the ground with a polybutene liquid, which may be liquid polybutene alone or a solution thereof in a compatible organic solvent, or an aqueous, oil-in-water type emulsion thereof. In all events, polybutene will be applied to the plants, i.e., trunks, branches, and foliage, in such proportions and at such rates as to kill effectively the existing plants and to suppress emergence and spreading of new ones.

Description of the prior art

Spiny and/or sticky shrubs and small trees, such as mesquite and tarbush, spread over extensive areas of Southwestern United States and the adjoining territory of Mexico and form virtually impenetrable thickets. This is a sad consequence of overgrazing, uncontrollable "firing" and other disturbances. Likewise, large areas running into millions of acres of land are covered by heavy brush and weedy herbs and stand unproductive and unused, while they could have been converted to usable range, if effective and economical means were known for getting rid of these weeds and brush.

Uncontrolled growth of weeds, such as well-known salt cedar, ubiquitous in the vicinity of water streams, irrigation canals and reservoirs in the southwestern states, for instance, in the lower Colorado River Basin, contribute to the exhaustion of the water supply in these largely arid regions. Soil conservation experts also have estimated that deep-rooted weed species are responsible for an annual water loss of from 230,000 to 300,000 acres/feet on the Rio Grande River above Elephant Butte Reservoir in New Mexico. Salt cedar and other phreatophytes readily establish themselves in locations where the water table is situated near the soil surface, be it in the vicinity of natural streams or of man-made canals and catchments. In the lower Colorado Basin alone, these "water-wasting" phreatophytes are estimated to cause a yearly water loss (by transpiration) amounting to 1,500,000 acres/feet.

Various methods for the elimination of objectionable plant growth have been proposed in the past. Methods of removal by mechanical means, as by bulldozing or "chainings," invariably require subsequent treatment with herbicides to prevent regrowth, and even then such methods are but half-way effective, necessitating additional mechanical removal of regrowth a year or two later. All this is evidently quite clostly. Burning or "firing" is a hazardous approach to the problem and causes air pollution. Spraying with hydrocarbon fuels, such as kerosene, diesel oil and fuel oil, is not sufficiently effective for the purpose as compared with the known applications of these hydrocarbon fuel materials as weed oils. Irrespective of the reasons, dense underbrush and phreatophytes are noted to resist complete destruction by treatments with diesel oil or like hydrocarbon liquids. Treatment with herbicides, that is, with sprayable formulations containing systemic poisons for the plants, is not necessarily a satisfactory solution of the problem of inhibiting objectionable plant growth. Herbicidal chemicals are not cheap; they present hazards of toxicity to animal life and hazards of contamination of water which is eventually used for irrigation of crops and by livestock. Manual application is costly; nor is airborne application (as from helicopters) cheap, and in this case there is always the task of "drift" of toxic herbicides. Surprisingly, in fact, such known effective plant systemic poisons as 2,4-dichlorophenoxy acetic acid and its derivatives are not effective on dense thickets, such as are formed by salt cedar.

SUMMARY OF THE INVENTION

It has now been found that undesirable plant infestation can be destroyed and its otherwise unrestrained spread can be effectively checked and essentially eliminated by applying thereto liquid polybutene either as such, or as a solution in a compatible organic solvent, but preferably as an emulsion in water, and desirably as a dilution of such polybutene emulsion in additional water.

In order to achieve adequate inhibition of the plant growth, the polybutene must be so deposited on the plant surface above the ground, i.e., on the trunks, branches, as to provide a coverage of from at least 0.0005 to about 0.01 cc., and preferably from about 0.001 to about 0.01 cc. of polybutene residue per 1 cm.$^2$ of the plant surface.

The liquid polybutenes contemplated for this application are polymers produced by polymerization of normal and branched-chain butenes and characterized by average molecular weights in the range from about 300 to about 2800 and by viscosities from about 40 to about 20,000 SSU at 210° F.

Polybutenes sold in commerce under the trademark designation "Oronite Polybutenes" Nos. 6 through 128, represent particularly suitable materials for preparing the formulations effective as inhibitors of plant growth in accordance with the present invention.

While the liquid polybutenes may be applied directly as such to the plants whose growth one wishes to check and suppress, one may also use these polybutenes in the form of their solutions in suitable, compatible organic solvents, such as chlorinated hydrocarbons, aromatic hydrocarbons, and petroleum hydrocarbon thinners, these latter being preferred.

In all events, whether used alone or as a solution, polybutenes applied at the rate which provides not less than 0.0005 cc. per 1 cm.$^2$ of the surface of the plant, and preferably is applied at the rate from about 0.001 to about 0.01 cc. per cm.$^2$, will effectively inhibit (kill) the objectionable plant growth.

DESCRIPTION OF EMBODIMENTS

It is preferred to apply polybutenes for the purpose of inhibiting growth of objectional plant life in the form of their emulsion concentrates. This latter term designates emulsions of polybutenes in water having a polybutene content (residue) of from about 40 to 75%, and preferably from about 50 to 70% by weight.

Any suitable emulsifier (anionic, cationic or non-ionic) in amounts effective and sufficient to produce stable oil-in-water type emulsions can be used. The emulsions can be formed in available conventional equipment, such as a mix-pot with a blade stirrer, a colloid mill, etc. These emulsion concentrates, whether used as such or diluted, can be applied in any known convenient manner, for instance, by painting the trunks of the plants with a brush, through spraying with the aid of any known apparatus used in agriculture or for surface-coatings or, yet, spraying from an airplane or a helicopter, would be generally resorted to in actual practice.

The polybutene emulsion concentrate, instead of being applied as such, that is, undiluted, may be diluted to reduce the viscosity of the treating liquid and thus to permit easier operation of the equipment. The dilution may be as low as 1 to 1, that is, if the emulsion contains 60% polybutene residue, the diluted liquid when ready for spraying will contain 60 parts of polybutene and 140 parts by weight of water. The polybutene-containing liquid is applied at such rates as would assure a good coverage comparable to the coverage currently applied in agricultural practice when spraying herbicides. Again, rates of application of these emulsion concentrates and/or their dilutions with water, in order to insure satisfactory inhibition of undesirable plant growth, must be such as to provide a coverage of at least 0.0005 cc. of polybutene residue per 1 cm.$^2$ of the plant surface. Generally, the application of the polybutene emulsion to the point of emulsion "run-off" from the plant surface is entirely satisfactory for most practical purposes.

The operativeness of the aforedescribed method of inhibiting plant growth with polybutene has been demonstrated in a number of practical applications, and the results of observations of several of these applications are given hereinafter for the purposes of illustration.

Application Test I

This application was made in late January at a location about one to two miles east of Thermal, Calif., in Coachella Valley. The salt cedar plants growing near the banks of an irrigation canal averaged 2 feet in height. An emulsion of 60% polybutene, known as "Oronite Polybutene No. 32" (average molecular weight 1400, and average viscosity at 210° F.—about 3000 SSU), was obtained by dispersing the polybutene in water with the aid of a nonionic alkyl phenyl polyoxyethylene ether dispersant, known under the trademark "Dispersant NIW." This dispersion in about 35% by weight of water was applied undiluted by manual spraying on a patch covered with about twelve salt cedar plants of an average height of 2 feet. Subsequent observations were made during the summer and indicated a good, essentially complete 100% "kill" of the sprayed salt cedar.

Application Test II

Four different plots of an average area of 50 x 100 ft. located on a farm near Tombstone, Ariz., were treated with four different kinds of polybutene emulsions. The polybutenes were "Oronite Polybutene No. 8," "Polybutene No. 24," "Polybutene No. 32," and "Polybutene No. 128," emulsified in each case with the air of 2% by weight of a commercial cationic quaternary ammonium salt emulsifier, sold under the trademark "Arquad T–50," to form an emulsion of 65% by weight of polybutene residue, the balance to 100% being water.

The development of salt cedar, which grew near, on, and in the irrigation canal, was quite extensive, the plants ranging from 6 inches to 6 feet in height. The spraying was carried out in late March. The areas were again observed throughout the summer and the fall, and early in December it became apparent that the "kill" of the smaller salt cedar plants (6 inches to 2 feet in height) was essentially 100% complete, while of the whole total of plants, 50% were killed. These results unmistakably indicate that, although some hardier, older plants may resist the inhibiting action of polybutene and, therefore, would require removal by additional mechanical means, the control of regrowth becomes definitely assured, and the cost of the mechanical removal of the plants remaining, if any, will be certainly minimized as compared with the mechanical removal attempted without the application of polybutene.

Further, and this is a particular consideration, when applying polybutene for suppressing the growth of phreatophytes growing on the banks of and actually in the streams of water, the presence of polybutene in the water, whether as a direct result of spraying or the eventual washing-off of the polybutene film from the killed plants falling into the water stream, does not create any problems of toxicity, which may arise with the application of modern, known herbicides.

Of course, where the local conditions permit, and whenever the circumstances so warrant, herbicides, e.g., 2,4-dichlorophenoxy acetic acid and its derivatives, compatible with polybutene, may be used combined therewith, provided they do not affect adversely the growth-inhibiting action of polybutene but, on the contrary, tend to intensify the "kill."

Likewise, the polybutene liquids, applied in accordance with the invention, either as such or as solutions or emulsions or dilutions of emulsions, may include minor amounts of compatible additives conventionally used in spraying practice, for instance, emulsion stabilizers and the like. Again, the only consideration in including and blending these additives with polybutene is that they would not detract from the desired growth-inhibiting effect thereof.

What is claimed is:

1. A method of destroying and inhibiting the growth of objectionable plants which comprises contacting the surface of the plants above the ground with liquid polybutene having an average molecular weight in the range from about 300 to about 2800 and applied at such a rate as to provide not less than 0.0005 cc. of polybutene per 1 cm.$^2$ of the plant surface.

2. A method as defined in claim 1 wherein the liquid polybutene is applied in the form of a solution thereof in an organic solvent.

3. A method as defined in claim 1 wherein the liquid polybutene is applied in the form of an oil-in-water type emulsion thereof and is present in an amount equal to at least about 40% by weight of the emulsion.

4. A method as defined in claim 3, wherein said polybutene emulsion essentially consists of from about 40 to about 75% by weight of polybutene having an average molecular weight in the range from about 300 to about 2800, a surface-active agent in an amount effective to emulsify said polybutene in water to produce a stable emulsion, and water in an amount bringing up the weight of the emulsion to 100%.

5. A method as defined in claim 4 wherein polybutene is present in said emulsion thereof in water in an amount of from about 50 to about 70% by weight.

6. A method of inhibiting plant growth by contacting the surface of the plants above the ground with a water dilution of an emulsion of 40 to 75% by weight of polybutene having an average molecular weight in the range from about 300 to about 2800 in water to make 100% by weight, the ratio of dilution being not lower than about one part of said emulsion to one part of water.

References Cited

UNITED STATES PATENTS

| | | | |
|---|---|---|---|
| 3,307,932 | 3/1967 | Guyot | 71—85 |
| 3,372,020 | 3/1968 | Regenstein | 71—85 |

FOREIGN PATENTS 623,410  7/1961  Canada.

LEWIS GOTTS, Primary Examiner

C. L. MILLS, Assistant Examiner